United States Patent
Okada et al.

(10) Patent No.: US 9,938,950 B2
(45) Date of Patent: Apr. 10, 2018

(54) ENGINE STARTING APPARATUS

(71) Applicant: DENSO CORPORATION, Kariya, Aichi-pref. (JP)

(72) Inventors: Tarou Okada, Owariasahi (JP); Mitsuhiro Murata, Niwa-gun (JP)

(73) Assignee: DENSO CORPORATION, Kariya (JP)

( * ) Notice: Subject to any disclaimer, the term of this patent is extended or adjusted under 35 U.S.C. 154(b) by 341 days.

(21) Appl. No.: 14/679,445

(22) Filed: Apr. 6, 2015

(65) Prior Publication Data
US 2015/0316017 A1   Nov. 5, 2015

(30) Foreign Application Priority Data

Apr. 4, 2014   (JP) .................... 2014-077778

(51) Int. Cl.
| F02D 11/00 | (2006.01) |
|---|---|
| F02N 11/08 | (2006.01) |
| F02N 15/06 | (2006.01) |
| H02K 3/12 | (2006.01) |
| H02K 3/28 | (2006.01) |

(Continued)

(52) U.S. Cl.
CPC ........ F02N 11/0851 (2013.01); F02N 11/087 (2013.01); F02N 15/067 (2013.01); H02K 3/12 (2013.01); H02K 3/28 (2013.01); H02K 7/116 (2013.01); *F02N 15/023* (2013.01)

(58) Field of Classification Search
CPC .. F02N 11/0851; F02N 11/087; F02N 15/067; F02N 15/023; H02K 7/116; H02K 3/28; H02K 3/12
See application file for complete search history.

(56) References Cited

U.S. PATENT DOCUMENTS 4,262,852 A * 4/1981 Dammar ................ H02K 15/09
                                                     242/433.3
5,159,908 A * 11/1992 Eyermann ........... F02N 11/0859
                                                     123/179.1

(Continued)

FOREIGN PATENT DOCUMENTS

| DE | 103 29 579 A1 | 3/2005 |
|---|---|---|
| DE | 10 2007 041 866 A1 | 8/2008 |

(Continued)

OTHER PUBLICATIONS

Sep. 11, 2015 Office Action issued in German Patent Application No. 10 2015 105 209.1.

*Primary Examiner* — Hieu T Vo
*Assistant Examiner* — Sherman Manley
(74) *Attorney, Agent, or Firm* — Oliff PLC (57) ABSTRACT

An apparatus for starting an engine, including a motor, an output shaft driven by the motor, a pinion provided along the output shaft, and an electro-magnetic solenoid device. The electro-magnetic solenoid device is configured to push the pinion axially toward a ring gear of the engine to mesh the pinion with the ring gear and transfer a rotational force, which is referred to as a motor torque, generated by energization of the motor from the pinion to the ring gear, thereby starting the engine. The apparatus is configured such that, at starting of the engine in its warmed-up state, the motor torque can continue to be applied from the pinion to the ring gear until at least the second compression stroke even when an engine speed varies.

10 Claims, 4 Drawing Sheets

(51) Int. Cl.
*H02K 7/116* (2006.01)
*F02N 15/02* (2006.01)

(56) References Cited

U.S. PATENT DOCUMENTS

| | | | | |
|---|---|---|---|---|
| 5,471,890 A | * | 12/1995 | Shiga | F02N 15/023 188/82.84 |
| 5,525,947 A | * | 6/1996 | Shiga | F02N 11/0851 335/126 |
| 5,656,981 A | * | 8/1997 | Niimi | F02N 11/087 335/126 |
| 6,822,544 B2 | * | 11/2004 | Shiga | F02N 11/087 335/126 |
| 7,145,259 B2 | * | 12/2006 | Spellman | F02N 11/0851 123/179.3 |
| 8,305,169 B2 | * | 11/2012 | Suzuki | F02N 11/087 335/126 |
| 8,860,235 B2 | * | 10/2014 | Bradfield | F02N 15/06 290/38 C |
| 8,872,369 B2 | * | 10/2014 | Bradfield | F02N 11/0851 290/38 R |
| 9,121,382 B2 | * | 9/2015 | Yamada | F02N 11/087 |
| 9,206,781 B2 | * | 12/2015 | Qin | F02N 11/0851 |
| 9,366,214 B2 | * | 6/2016 | Hirabayashi | F02N 11/00 |
| 2002/0053961 A1 | * | 5/2002 | Kajino | F02N 11/087 335/126 |
| 2003/0189472 A1 | * | 10/2003 | Shiga | F02N 11/087 335/126 |
| 2003/0193382 A1 | * | 10/2003 | Shiga | F02N 11/087 335/126 |
| 2004/0017086 A1 | * | 1/2004 | Shiga | F02N 11/0851 290/38 R |
| 2004/0070209 A1 | * | 4/2004 | Shiga | F02N 11/02 290/38 R |
| 2004/0263018 A1 | | 12/2004 | Arendes et al. | |
| 2005/0184838 A1 | * | 8/2005 | Niimi | F02N 15/067 335/126 |
| 2008/0162007 A1 | * | 7/2008 | Ishii | F02N 11/0855 701/54 |
| 2008/0179983 A1 | | 7/2008 | Hasegawa et al. | |
| 2009/0072941 A1 | | 3/2009 | Hasegawa et al. | |
| 2009/0206965 A1 | * | 8/2009 | Niimi | H01H 50/54 335/106 |
| 2010/0170084 A1 | | 7/2010 | Hasegawa et al. | |
| 2010/0187936 A1 | | 7/2010 | Hasegawa et al. | |
| 2015/0308395 A1 | * | 10/2015 | Atluru | H01C 7/06 290/38 R |
| 2015/0316017 A1 | * | 11/2015 | Okada | F02N 11/0851 290/38 C |

FOREIGN PATENT DOCUMENTS

| | | |
|---|---|---|
| DE | 10 2010 041 717 A1 | 4/2012 |
| DE | 10 2010 041 721 A1 | 4/2012 |
| JP | H07109967 A | 4/1995 |
| JP | H08-319923 A | 12/1996 |
| JP | 2004-257482 A | 9/2004 |
| JP | 2009-162196 A | 7/2009 |
| JP | 2009-284672 A | 12/2009 |
| JP | 2013-083174 A | 5/2013 |

* cited by examiner

ENGINE STARTING APPARATUS

CROSS-REFERENCE TO RELATED APPLICATION

This application is based on and claims the benefit of priority from earlier Japanese Patent Applications No. 2014-77778 filed Apr. 4, 2014, the descriptions of which are incorporated herein by reference.

BACKGROUND

1. Technical Field

The present invention relates to an engine starting apparatus capable of starting an engine at a high rotational speed.

2. Related Art

Conventionally, a starter for starting an engine is provided with a speed reducer in order to generate a torque equal to or greater than a pass-over torque at high temperatures where the engine load can be excessive. For example, a starter, as disclosed in Japanese Patent Application Laid-Open Publication No. 2004-257482, is provided with a planetary reducer between an armature axis and an output shaft of a motor, thereby reducing a motor speed, that is, amplifying the motor torque, and transmitting the torque to the output shaft. Such a starter is referred to as a speed-reduction starter.

However, it is inevitably difficult for such a speed-reduction starter to increase a cranking speed, which may cause a relative speed between the engine speed and the motor speed. In the presence of such a relative speed, a tooth surface of a pinion may strike a tooth surface of a ring gear during a compression stroke of the engine, which may cause excessive impact between the pinion and the ring gear. Thus, the speed-reduction starter may suffer from noise caused by stress and impact on a driver of the starter. Particularly, when the engine is in a warmed-up state, engine acceleration during an expansion stroke is increased, which inevitably leads to an increased relative speed between the high engine speed and the motor speed. The impact during the compression stroke is increased with increasing relative speed between the high engine speed and the motor speed.

In consideration of the foregoing, exemplary embodiments of the present invention are directed to providing a starter capable of preventing an impact on the starter from occurring during a compression stroke at starting of the engine.

SUMMARY

In accordance with an exemplary embodiment of the present invention, there is provided an apparatus for starting an engine, including: a motor; an output shaft driven by the motor; a pinion provided along the output shaft; and an electro-magnetic solenoid device configured to push the pinion axially toward a ring gear of the engine to mesh the pinion with the ring gear and transfer a rotational force (referred to as a motor torque) generated by energization of the motor from the pinion to the ring gear, thereby starting the engine. The apparatus is configured such that, at starting of the engine in its warmed-up state, the motor torque can continue to be applied from the pinion to the ring gear until at least the second compression stroke even when an engine speed varies.

With the engine starting apparatus configured as above, even when engine acceleration during an expansion stroke of the engine in a warmed-up state is increased, the rotation of the pinion is allowed to follow the rotational acceleration of the engine. That is, at starting of the engine in its warmed-up state, the motor torque can continue to be applied from the pinion to the ring gear until at least the second compression stroke even when an engine speed varies. Thus, the relative peripheral speed of the ring gear and the pinion can be eliminated, which can lead to a reduced impact between the pinion and the ring gear. This can reduce stress on a starter driver and prevent occurrence of noise caused by the stress.

DESCRIPTION OF SPECIFIC EMBODIMENTS

With reference to the accompanying drawings, hereinafter are specifically described several embodiments of the present invention.

First Embodiment

Figure 1:
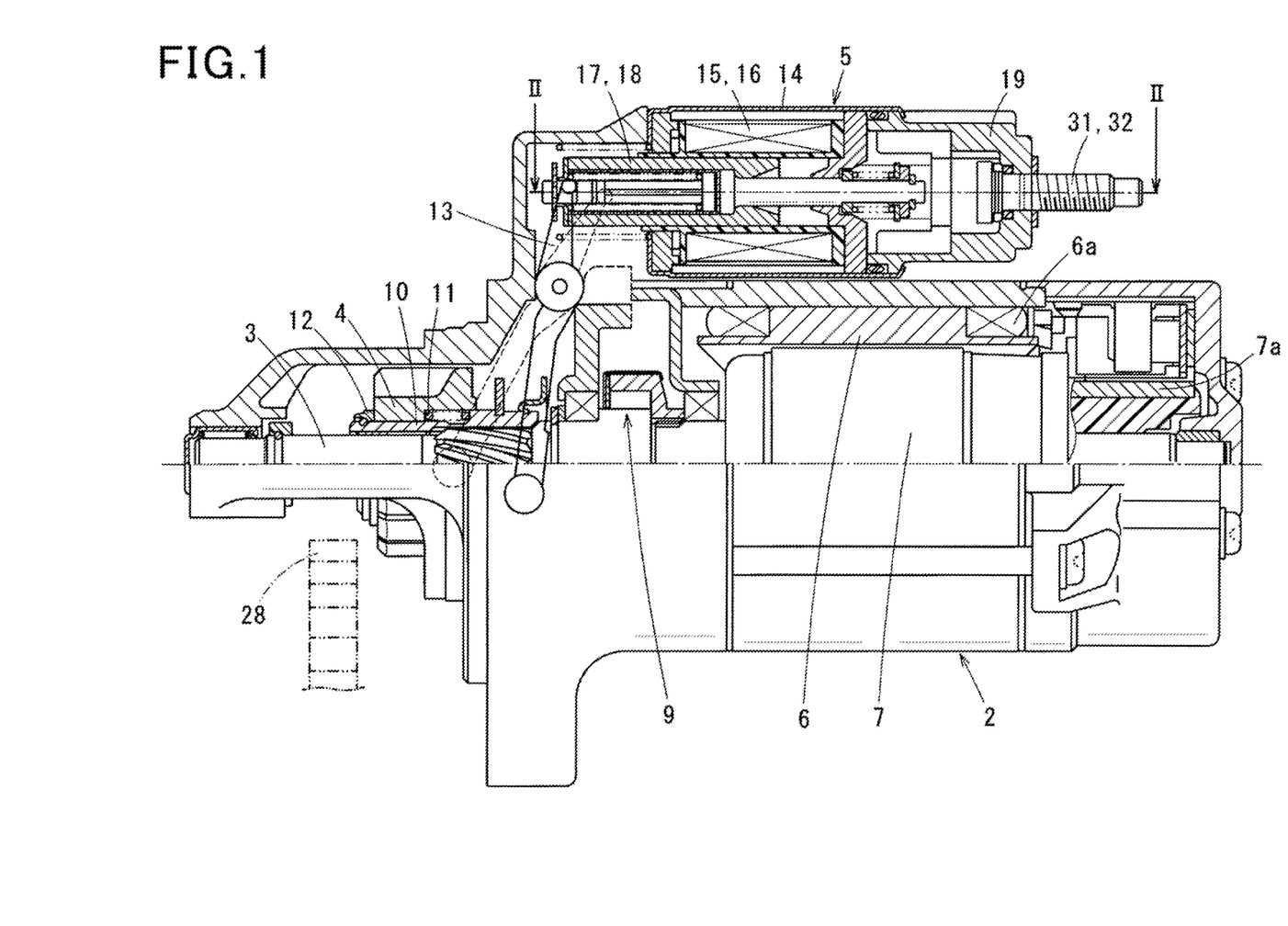
FIG. 1 is a cross-sectional view of a starter in accordance with a first embodiment of the present invention.

A starter 1 (as an engine starting apparatus) of the first embodiment is a high-acceleration starter, an unloaded rotational speed of which can be increased to near an idle speed of an engine, and includes, as shown in FIG. 1, a motor 2, an output shaft 3 driven by the motor 2, a pinion 4 provided along the output shaft 3, an electro-magnetic solenoid device 5 and others.

The motor 2 is a commutator motor including a field element 6 configured to generate a magnetic field, an armature 7 rotationally supported on an inner periphery of the field element 6 with a clearance between an outer periphery of the armature 7 and the inner periphery of the field element 6 and including a commutator 7a on an axis of the armature 7, and brushes 8 (see FIG. 3) configured to slide on the outer periphery of the commutator 7 as the armature 7 rotates. The field element 6 shown in FIG. 1 is an electromagnet field configured to form an electromagnet through energization of a field winding 6a. Alternatively, the magnetic-field generator 6 may be a permanent magnet field.

The output shaft 3 is arranged coaxially with an armature axis 7a through a clutch 9 so that rotation of the armature axis 7a can be transferred to the output shaft 3 via the clutch 9, which allows the output shaft 3 to rotate at the same rotational speed as the armature axis 7a. The clutch 9 is a one-way roller clutch not only for transferring the rotation from the armature axis 7a to the output shaft 3, but also for isolating transfer of torque from the output shaft 3 to the armature axis 7a.

The pinion 4 is straight-splined to an outer periphery of a pinion tube 10 and is urged toward a distal end of the pinion tube 10 (e.g., in the right-to-left direction of FIG. 1) by a pinion spring 11. The pinion tube 10 is helical-splined to an outer periphery of the output shaft 3 to be able to axially move integrally with the pinion 4 on the output shaft 3. A pinion stopper 12 is provided at the distal end of the pinion tube 10 for restricting movement of the pinion 4 urged by the pinion spring 11.

The electro-magnetic solenoid device 5 will now be explained with reference to FIGS. 2 and 3. The electro-magnetic solenoid device 5 includes two solenoids SL1, SL2. The electro-magnetic solenoid device 5 is configured to close first and second switches (described later) by operation of the solenoids SL1, SL2 and push the pinion 4 in the anti-motor direction (e.g., in the right-to-left direction of FIG. 1) via a lever 13.

The solenoids SL1, SL2 include a shared frame 14 which also serves as part of a magnetic circuit, the first and second coils 15, 16 arranged in parallel with each other inside the frame 14, first and second plungers 17, 18 that are axially movable on inner peripheries of the respective coils 15, 16, and others. Elements other than the solenoids 15, 16 and the plungers 7, 18, having the same functions are assigned the same numbers.

The frame 14 is bottomed and cylindrically-shaped with one end open and the other end closed by a resin cover 19. The bottom of the frame 14 has two circular apertures so that the first and second plungers 17, 18 are axially movable through the respective apertures. The resin cover 19 has thereinside a contact compartment. First and second switches are arranged in the contact compartment. As shown in FIG. 3, the first coil 15 is electrically connected to a first movable contact 34 at one end and to ground at the other end.

Figure 3:
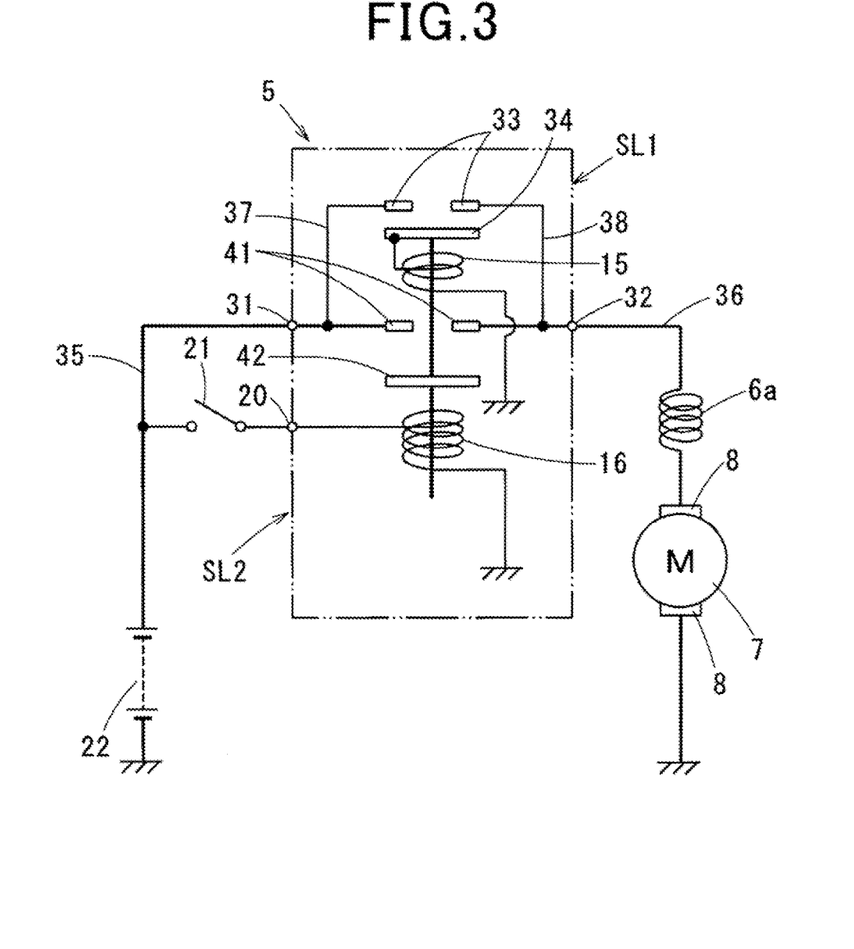
FIG. 3 is a circuit diagram of the starter of the first embodiment.

As shown in FIG. 3, the second coil 16 is electrically connected to an energization terminal 20 at one end and to ground at the other end. The energization terminal 20 is electrically connected to a battery 22 via a start circuit including a starter relay 21. When the starter relay 21 is turned on, excitation current is supplied from the battery 22.

Figure 2:
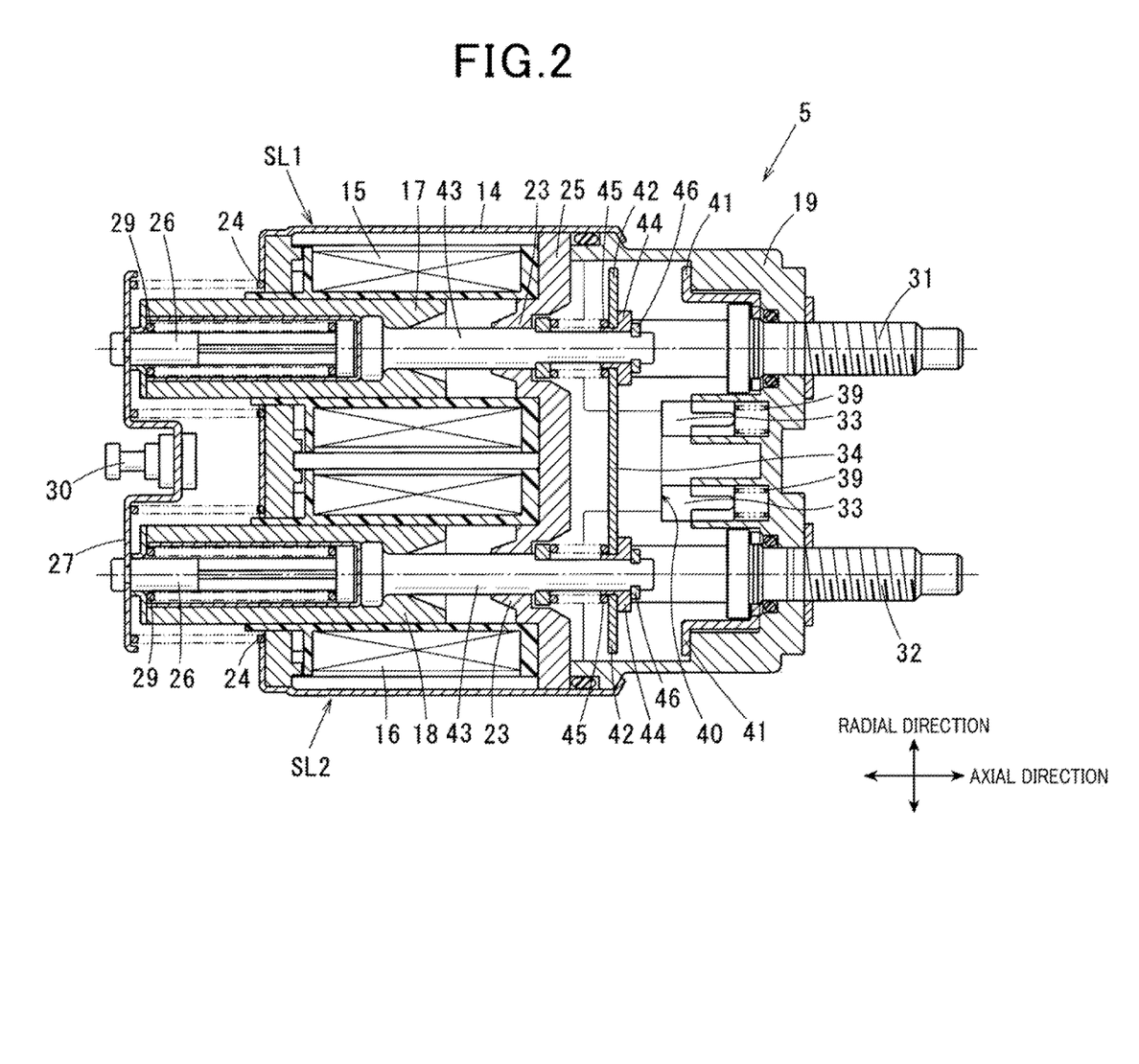
FIG. 2 is a cross-sectional view of an electro-magnetic solenoid device taken along line II-II of FIG. 1.

The first and second plungers 17, 18, as shown in FIG. 2, are respectively arranged axially facing a first stationary core 23 and urged by return springs 24 in the anti-stationary-core direction (e.g., in the right-to-left direction of FIG. 1). The first stationary core 23 is provided integrally with a second stationary core 25 disposed on the opposite side of the first stationary core 23 to the first and second coils 15, 16.

Each of the first and second plungers 17, 18 has a cylindrical bore at its axially anti-stationary-core side, in which bore a rod 26 is inserted. End portions of the rods 26 of the respective first and second plungers 17, 18 projecting from the respective cylindrical bores are connected by a connection plate 27. In each of the cylindrical bores of the respective first and second plungers 17, 18, a drive spring 29 is provided on an outer periphery of the rod 26 for storing a reaction force for pushing the pinion 4 against the ring gear 28 of the engine when the first and second plungers 17, 18 are attracted by the electromagnet to move.

The return spring 24 is provided on the outer periphery of a portion of each of the first and second plungers 17, 18 projecting from the bottom of the frame 14 and extending between the connection plate 27 and the bottom of the frame 14.

A joint portion 30 is secured to a center portion of the connection plate 27. The joint portion 30 and the pinion tubes 10 are connected by the lever 13 (see FIG. 1).

A first switch includes a pair of first stationary contacts 33 electrically connected along an energization path for the motor 2 via two terminal bolts 31, 32 attached to the resin cover 19, and the first movable contact 34 for connecting and disconnecting between the pair of first stationary contacts 33. The energization path for the motor 2 refers to a power-supply line for supplying electrical power from the battery 22 to the motor 2.

The two terminal bolts 31, 32 include, as shown in FIG. 3, a B-terminal bolt 31 electrically connected to the battery 22 via a cable 35 and an M-terminal bolt 32 electrically connected to the field winding 6a of the motor 2 or to a positive brush 8 via a motor lead 36.

The pair of first stationary contacts 33 are formed by, for example, carbon-based resistors having a resistance approximately equal to that of the brush 8 of the motor 2. As shown in FIG. 3, one of the first stationary contacts 33 is electrically connected to the B-terminal bolt 31 via a lead wire 37, and the other of the first stationary contacts 33 is electrically connected to the M-terminal bolt 32 via a lead wire 38. The first stationary contacts 33 are received in respective cylindrical holder portions protruding into the contact compartment of the resin cover 19 so that the first stationary contacts 33 are axially movable a predetermined distance. As shown in FIG. 2, contact springs 39 are provided in the respective holder portions of the resin cover 19 for urging the respective stationary contacts 33 against the first movable contact 34. In addition, anti-spring side contact faces of the respective first stationary contacts 33 projecting outside the holder portions are stationary in contact with the stop surface 40.

A second switch includes, as shown in FIG. 3, a pair of second stationary contacts 41 electrically connected along the energization path for the motor 2 in parallel with the pair of first stationary contacts 33, and a second movable contact 42 for connecting and disconnecting between the pair of second stationary contacts 41. The first movable contact 34 and the second movable contact 42 are, as shown in FIG. 2, different portions of the same contact plate, and secured to plunger rods 43 respectively affixed to the first and second plungers 17, 18 via respective insulating members 44. That is, a center portion of the contact plate facing the pair of first stationary contacts 33 is used as the first movable contact 34. Both end portions of the contact plate facing the pair of second stationary contacts 41 are used as the second movable contact 42. The first movable contact 34 and the second movable contact 42 are urged by respective contact springs 45 against washers 46 secured to respective end portions of the plunger rods 43 so as to prevent the first movable contact 34 and the second movable contact 42 from being withdrawn from the plunger rods 43.

The contact plate forming the first and second movable contacts 34, 42, and the second stationary contacts 41 are each a metallic plate (e.g., copper or copper alloy) of higher electrical conductivity than the first stationary contacts 33.

For the first and second switches, a distance between the pair of second stationary contacts 41 and the second movable contact 42 is greater than a distance between the pair of first stationary contacts 33 and the first movable contact 34. That is, when the starter relay 21 is turned on and the second coil 16 is thereby excited, the first plunger 17 and the second plunger 18 are simultaneously drawn into their respective coils 15, 16, which allows the first switch to be closed earlier than the second switch. In addition, one of terminals of the first coil 15 is electrically connected to the first movable contact 34. When the first movable contact 34 contacts the pair of first stationary contacts 33 and the first switch is thereby closed, which allows excitation current to flow via the B-terminal bolt 31. That is, when the first switch is closed and the first coil 15 is thereby energized, the first plunger 17 and the second plunger 18 are further drawn into their respective coils 15, 16 by plunger attraction forces generated by energization of the first coil 15 and the second coil 16, which allows the second switch to be closed. The plunger attraction force generated by energization of the first coil 15 is set less than a set load of the contact springs 39 or the drive springs 29.

The operation of the starter 1 will now be explained.

When the starter relay 21 is turned on and excitation current is thereby supplied from the battery 22 to the second coil 16, the first plunger 17 and the second plunger 18 are simultaneously drawn into their respective coils 15, 16 by the plunger attraction force generated by the second coil 16. As the first plunger 17 and the second plunger 18 move, the pinion 4 is pushed via the lever 13 in the axial anti-motor direction along the output shaft 3. When the pinion 4 and the ring gear 28 are out of meshing phase, axial end faces of teeth of the pinion 4 and axial end faces of teeth of the ring gear 28 abut each other, which causes axial movement of the pinion 4 to be terminated. As the first and second plungers 17, 18 move further after the movement of the pinion 4 has been terminated, the pinion spring 11 is bent and the pinion tube 10 is pushed toward the ring gear 28 while rotating along the helical spline on the output shaft 3. When the pinion 4 and the ring gear 28 match in meshing phase during the rotation of the pinion tube 10, the pinion 4 and the ring gear 28 successfully mesh with each other under influence of the reactive forces of the pinion spring 11 and the drive springs 29.

When the first switch is closed substantially at the same time that the pinion 4 and the ring gear 28 successfully mesh with each other, preferably at the instant that the pinion 4 abuts the ring gear 28, an energization path (herein referred to as a first energization path) is formed for supplying electrical power from the battery 22 to the motor 2 via the first switch. A rated voltage of the battery 22 is stepped down by the pair of first stationary contacts 33 that are resistors, and the stepped down voltage is applied to the motor 2. This allows the motor 2 to start to rotate at a low speed. The rotation of the motor 2 is transferred to the clutch 9, the output shaft 3, the pinion tube 10, and the pinion 4, in his order. The low speed rotation of the pinion 4 allows the ring gear 28 to rotate at a low speed.

When the first switch is closed, the excitation current flows through the B-terminal bolt 31, the first switch, and the coil 15 in this order, which causes plunger attraction forces to be generated in both the second coil 16 (already excited) and the first coil 15. When the first and second plungers 17, 18 are drawn further into their respective coils, the second switch is closed, which allows an energization path (herein referred to as a second energization path) for bypassing the pair of first stationary contacts (here resistors) 33 to be formed. This allows the rated voltage of the battery 22 to be applied to the motor 2 without being stepped down, which allows the motor 2 to rotate at a high speed. The high speed rotation of the pinion 4 is transferred from the pinion 4 to the ring gear 28, which allows the engine to be started at the high speed.

(Advantages)

When the high-acceleration starter 1 starts the engine in the warmed-up state, the torque of the motor 2 can continue to be applied from the pinion 4 to the ring gear 28 until at least the second compression stroke even when the engine speed varies. That is, a relative peripheral speed of the ring gear 28 and the pinion 4 can be zero. This can lead to a reduced impact between the pinion 4 and the ring gear 28 without the excessive impact occurring during cranking of the engine as in the conventional starter, which can reduce stress on the starter driver, thereby preventing occurrence of noise caused by the impact.

Even with use of a high-acceleration starter as the starter 1, closing the first switch earlier than the second switch allows the rotational speed of the pinion 4 to be constrained, which can reduce the impact occurring at meshing of the pinion 4 with the ring gear 28 and ensure a sufficient engagement depth without causing unmeshing of teeth between the pinion 4 and the ring gear 28.

Indeed, the rotational speed of the pinion 4 can be constrained by some physical means from when the pinion 4 abuts the ring gear 28 to when the pinion 4 meshes with the ring gear 28, which, however, leads to larger loads for the battery 22 with associated energy losses. In contrast, in the present embodiment, the starter 1 includes rotation constraining means configured to constrain the rotation (i.e., the rotational speed) of the pinion 4 at least from when the pinion 4 abuts the ring gear 28 to when the pinion 4 meshes with the ring gear 28 by constraining the activation current of the motor 2, which can reduce the energy losses and reduce the battery loads. That is, the rotation constraining means of the present embodiment is current constraining means for constraining the activation current of the motor 2, thereby constraining the rotation of the pinion 4.

In the first embodiment, each of the first stationary contacts 33 is formed of the carbon-based resistor for constraining the activation current of the motor 2. This can prevent welding or contact freezing of the contacts 33, 34 which may occur when the first switch is closed. In addition, this can eliminate a need for additional resistors other than the first stationary contacts 33 to be provided along the first energization path, which can simplify the first energization path.

In the electro-magnetic solenoid device 5 of the present embodiment, one of terminals of the first coil 15 is electrically connected to the first movable contact 34, which can lead to a single energization terminal 20. This can thus eliminate a need for additional energization terminals other than the energization terminal 20. In addition, the first coil 15 is excited by closing the first switch, which can eliminate a need for an electronic control unit (ECU) or the like to electrically control when the first coil 15 is energized.

In the first embodiment, a distance between contacts of the second switch that is a distance between the pair of second stationary contacts 41 and the second movable contact 42 is set greater than a distance between contacts of the first switch that is a distance between the pair of first stationary contacts 33 and the first movable contact 34. This reliably allows the first switch to be closed earlier than the second switch. In addition, a delay time from when the first switch is closed to when the second switch is closed can be appropriately set by changing the distance between contacts of the first switch and the distance between contacts of the second switch. The time interval that the pinion is rotated at a low speed is increased with increasing delay time, which allows the pinion 4 to mesh with the ring gear 28 reliably.

The plunger attraction force generated by energization of the second coil 16 that is followed by energization of the first coil 15 is set less than a set load of the contact spring 39 or the drive spring 29. This allows axial movement of the first and second plungers 17, 18 to be temporarily terminated, thereby increasing the delay time from when the first switch is closed to when the second switch is closed.

As to the electro-magnetic solenoid device 5 of the first embodiment, the first and second coils 15, 16 are placed in the single frame 14. That is, the first and second coils 15, 16 share the frame 14. Since the frame 14 serves as part of the magnetic circuit, the coils 15, 16 are commonly placed in respective frames. In consideration of a mounting space for the starter, it is desirable to minimize dimensions of the starter. To this end, how to wind the first and second coils 15, 16 has been devised. For example, the first and second coils 15, 16 are wound in opposite directions to eliminate the magnetic saturation, which allows the first and second coils 15, 16 to share the single frame 14.

The starter 1 of the first embodiment is configured such that the pinion 4 axially moves alone along the output shaft 3. That is, the clutch 9 does not move integrally with the pinion 4. This can reduce weights of movable components (the pinion 4 and the pinion tube 10) as compared with a starter configured such that the clutch 9 moves integrally with the pinion 4, thereby downsizing the electro-magnetic solenoid device 5. In addition, the reduction in weight of movable components can increase the engagement depth of the pinion 4 and the ring gear 28. Further, the one-way clutch 9 is disposed between the armature axis 7a and the output shaft 3, which allows the engine to be restarted even before complete shutdown of the engine after termination of the fuel injection into the engine via engine idle stop (during coasting of the ring gear 28).

A second embodiment of the present invention will now be explained, where only differences of the second embodiment from the first embodiment will be explained. Elements having the same functions as in the first embodiment are assigned the same numbers and will not be described again, for brevity.

Second Embodiment

Generally, as an unloaded rotational speed of the direct-current (DC) motor 2 as used in the first embodiment increases, a torque generated in the motor 2 decreases. Therefore, there is a need to increase the torque generated in the motor 2 of the high-acceleration starter 1 described in the first embodiment.

Figure 4:
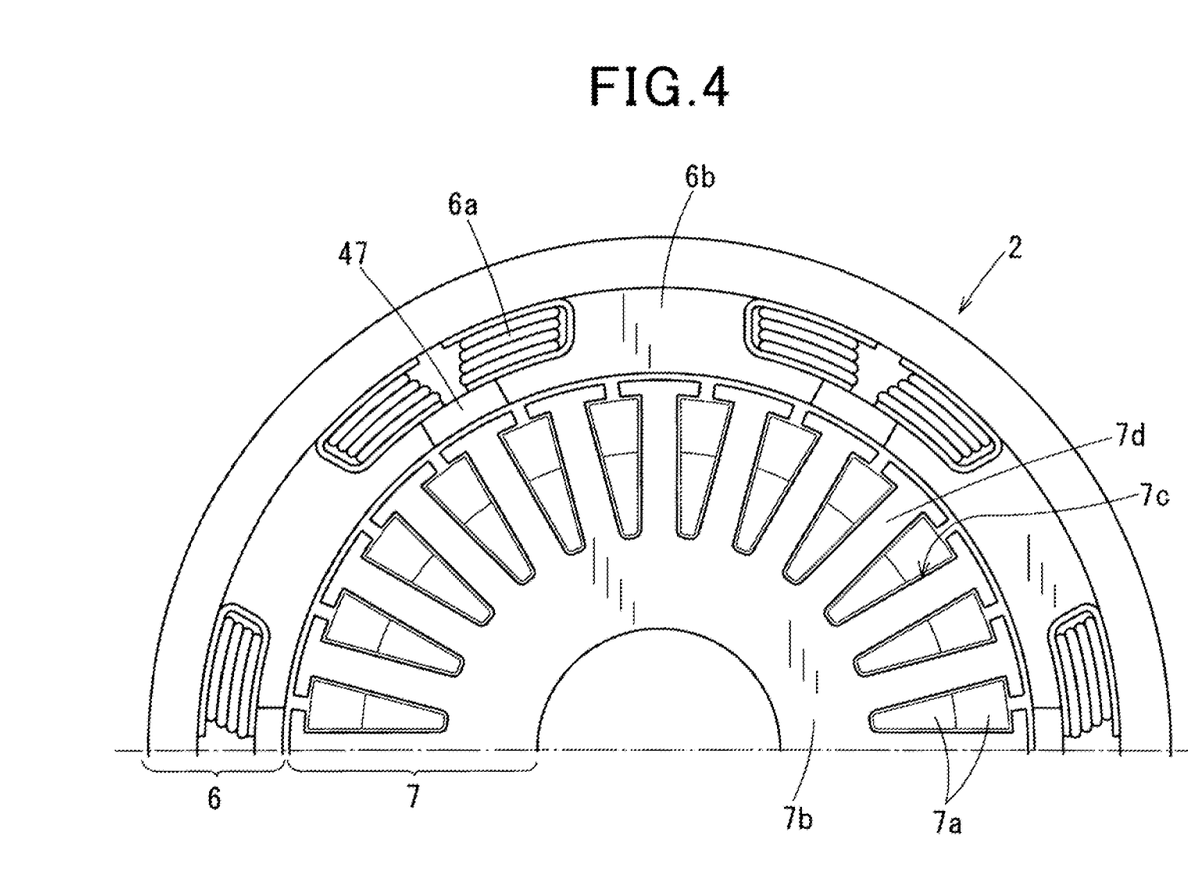
FIG. 4 is a cross-sectional view of a motor in accordance with a second embodiment of the present invention.

A motor 2 of the second embodiment includes, as shown in FIG. 4, a field element 6 that is a winding field formed of a field iron core 6b and a field winding 6a around the field iron core 6b, and an armature 7 formed of an armature iron core 7b and an armature wave winding 7a around the armature iron core 7b.

The field winding 6a is an edgewise-winding of rectangular wire with a rectangular cross section. The motor 2 further includes plural magneto-motive force generating sections 47 for generating a magneto-motive force, each between a respective pair of circumferentially adjacent field poles. Each magneto-motive force generating section 47 is formed of a permanent magnet or the like.

The armature iron core 7b includes teeth 7d, each between a respective pair of circumferentially adjacent slots 7c, where each tooth 7d has a constant circumferential width along a radial direction from the inner periphery to the outer periphery of the armature iron core 7b. In other words, each slot 7c has an aperture width gradually increasing along the radial direction from the inner periphery to the outer periphery of the armature iron core 7b.

In each slot 7c is inserted plural segments of the armature winding 7a corresponding to the slot 7c, where these segments are different in shape, more specifically, each segment has a width in the circumferential direction of the armature iron core 7b such that the segment can be fitted in the slot 7c.

In the case of each slot 7c having a constant aperture width along the radial direction from the inner periphery to the outer periphery of the armature iron core 7b, the circumferential width of each tooth 7d would gradually increase along the radial direction from the inner periphery to the outer periphery of the armature iron core 7b. In such a case, a magnetic flux passing through each tooth 7d could saturate at the inner-periphery side of the tooth 7d, which could not lead to adequate performance. In contrast, in the present embodiment, segments of the armature winding 7a fitted in each slot 7c are different in shape, so that each tooth 7d has a constant circumferential width along the radial direction from the inner periphery to the outer periphery of the armature iron core 7b. This can eliminate the saturation of magnetic flux, thereby improving the performance.

In addition, the plural segments of the armature winding 7a in each slot 7c have the same cross-sectional area. This allows the armature winding 7a to be made of the same parent material although the segments of the armature winding 7a fitted in each slot 7c are different in shape.

(Modifications)

In the first embodiment, each of the first stationary contacts 33 is formed of the carbon-based resistor. Alternatively, a resistor may be electrically connected between one of the first stationary contacts 33 and the B-terminal bolt 31 or between the other of the first stationary contacts 33 and the M-terminal bolt 32. Like the second stationary contacts 41, the first stationary contacts 33 may be made of metal of high electrical conductivity (e.g., copper or copper alloy).

What is claimed is:

1. An apparatus for starting an engine, comprising:
   a motor;
   an output shaft driven by the motor;
   a pinion provided along the output shaft;
   an electro-magnetic solenoid device configured to push the pinion axially toward a ring gear of the engine to mesh the pinion with the ring gear and transfer a rotational force generated by energization of the motor from the pinion to the ring gear, thereby starting the engine, the rotational force being referred to as a motor torque; and
   rotation constraining means for constraining rotation of the pinion, the rotation constraining means being configured to constrain the rotation of the pinion at least from when the pinion abuts the ring gear to when the pinion meshes with the ring gear,
   wherein, at starting of the engine in its warmed-up state, the motor torque can continue to be applied from the pinion to the ring gear until at least the second compression stroke even when an engine speed varies,
   wherein the rotation constraining means comprises current constraining means for constraining activation current of the motor, thereby constraining, the rotation of the pinion,
   wherein the current constraining means comprises at least one resistor,
   wherein the apparatus further comprises:
   a first switch configured to close and open a first energization path for energizing the motor, the first energization path passing through the at least one resistor;
   a second switch configured to close and open a second energization path for energizing the motor, the second energization path bypassing the at least one resistor;
   a second coil for generating an electromagnetic force to close the first switch; and
   a first coil for generating an electromagnetic force to close the second switch in combination with the electromagnetic force generated by the second coil, and wherein the electro-magnetic solenoid device is configured to close the first switch at starting of the engine, and close the second switch after closing the first switch.

2. The apparatus of claim 1, wherein the at least one resistor is carbon-based.

3. The apparatus of claim 1, wherein the first coil is supplied with excitation current via the first switch after the first switch being closed by energization of the second coil.

4. The apparatus of claim 3, wherein the first coil and the second coil are placed in a single frame.

5. The apparatus of claim 1, wherein the first coil and the second coil are arranged axially in parallel with each other.

6. The apparatus of claim 1, wherein the electro-magnetic solenoid device comprises a first plunger that is axially movable on an inner periphery of the first coil, and a second plunger that is axially movable on an inner periphery of the second coil, the first and second plungers being connected to be movable integrally with each other, the first switch comprises a pair of first stationary contacts electrically connected along the first energization path and arranged to be axially movable a predetermined distance, and a first movable contact for connecting and disconnecting between the pair of first stationary contacts in conjunction with movement of the first plunger, the second switch comprises a pair of second stationary contacts electrically connected along the second energization path, and a second movable contact for connecting and disconnecting between the pair of second stationary contacts in conjunction with movement of the second plunger, the first movable contact and the second movable contact together form a single contact member, and a distance between the pair of first stationary contacts and the first movable contact is set less than a distance between the pair of second stationary contacts and the second movable contact.

7. The apparatus of claim 6, wherein the electro-magnetic solenoid device further comprises contact springs for urging the respective stationary contacts against the first movable contact, and drive springs for storing reaction forces to mesh the pinion with the ring gear, and plunger attraction force generated by energization of the second coil is less than a set load of the contact spring or the drive spring.

8. The apparatus of claim 6, wherein each of the pair of first stationary contacts comprises the resistor.

9. The apparatus of claim 1, wherein the pinion is helical-splined to an outer periphery of the output shaft driven by the motor so that the pinion can be axially pushed alone toward the ring gear by operation of the electro-magnetic solenoid device.

10. The apparatus of claim 9, further comprising a one-way clutch disposed between an armature axis of the motor and the output shaft.

* * * * *